(12) United States Patent
Savic et al.

(10) Patent No.: US 7,217,369 B2
(45) Date of Patent: May 15, 2007

(54) MESO-MICROELECTROMECHANICAL SYSTEM HAVING A GLASS BEAM AND METHOD FOR ITS FABRICATION

(75) Inventors: Jovica Savic, Downers Grove, IL (US); Manes Eliacin, Buffalo Grove, IL (US); Junhua Liu, Palatine, IL (US); Aroon V. Tungare, Winfield, IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/380,983

(22) Filed: May 1, 2006

(65) Prior Publication Data

US 2006/0226732 A1    Oct. 12, 2006

Related U.S. Application Data

(62) Division of application No. 11/004,354, filed on Dec. 3, 2004, now abandoned.

(51) Int. Cl.
*C23F 1/00*    (2006.01)
*H01L 21/00*    (2006.01)

(52) U.S. Cl. ............................................ 216/2; 438/52
(58) Field of Classification Search .................... 216/2, 216/24; 438/52
See application file for complete search history.

(56) References Cited

U.S. PATENT DOCUMENTS 5,454,906 A * 10/1995 Baker et al. ................... 216/66
5,579,151 A   11/1996 Cho
6,020,215 A *  2/2000 Yagi et al. ..................... 438/52
6,075,639 A    6/2000 Kino et al.
6,290,858 B1 * 9/2001 Hirtreiter et al. .............. 216/2
6,649,852 B2 11/2003 Chason et al.
6,714,105 B2  3/2004 Eliacin et al.
6,800,820 B1 10/2004 Liu et al.
6,859,119 B2  2/2005 Eliacin et al.
2002/0149294 A1 10/2002 Matsumoto et al.
2005/0134141 A1  6/2005 Savic et al.

FOREIGN PATENT DOCUMENTS

WO    0046852    8/2000

OTHER PUBLICATIONS

Belloy et al.: "Micromachining of Glass Inertia Sensors", Journal of Microelectromechanical systems, vol. 11, No. 1, Feb. 2002, pp. 85-90.

* cited by examiner

*Primary Examiner*—Parviz Hassanzadeh
*Assistant Examiner*—Roberts Culbert

(57) ABSTRACT

A meso-electromechanical system (900, 1100) includes a substrate (215), a standoff (405, 1160) disposed on a surface of the substrate, a first electrostatic pattern (205, 1105, 1110, 1115, 1120) disposed on the surface of the substrate, and a glass beam (810). The glass beam (810) has a fixed region (820) attached to the standoff and has a second electrostatic pattern (815, 1205, 1210, 1215, 1220) on a cantilevered location of the glass beam. The second electrostatic pattern is substantially co-extensive with and parallel to the first electrostatic pattern. The second electrostatic pattern has a relaxed separation (925) from the first electrostatic pattern when the first and second electrostatic patterns are in a non-energized state. In some embodiments, a mirror is formed by the electrostatic materials that form the second electrostatic pattern. The glass beam may be patterned using sandblasting (140).

6 Claims, 7 Drawing Sheets

MESO-MICROELECTROMECHANICAL SYSTEM HAVING A GLASS BEAM AND METHOD FOR ITS FABRICATION

RELATIONSHIP TO OTHER APPLICATIONS

This application is a divisional application of U.S. application Ser. No. 11/004,354, filed on Dec. 3, 2004 now abandoned and assigned to the assignee hereof.

BACKGROUND

Optical switches based on opto-electromechanical, electro-optic, or liquid crystal technologies are commercially available. The commercial opto-electromechanical switches are typically fabricated in silicon using silicon-processing techniques, and comprise micron dimension mirrors that can be electro-statically actuated. They are classified as microelectromechanical systems (MEMS). Cost, reliability of operation, and power drain are the primary drawbacks of these commercially available optical switches. In order to improve reliability, elaborate processes are used to hermetically seal the MEMS structures—further adding to the cost.

In another MEMS technology, called the meso-MEMS technology, low cost switches are fabricated on a polymer structure with a mechanical cantilever member that is at least partially made of metal—typically copper. These have been shown to provide useful electrical switching functions, such as for RF signal switching.

What is needed is a more reliable and lower cost switch technology that can be used for optical switching.

BRIEF DESCRIPTION OF THE DRAWINGS

The present invention is illustrated by way of example and not limitation in the accompanying figures, in which like references indicate similar elements, and in which.

Figure 1:
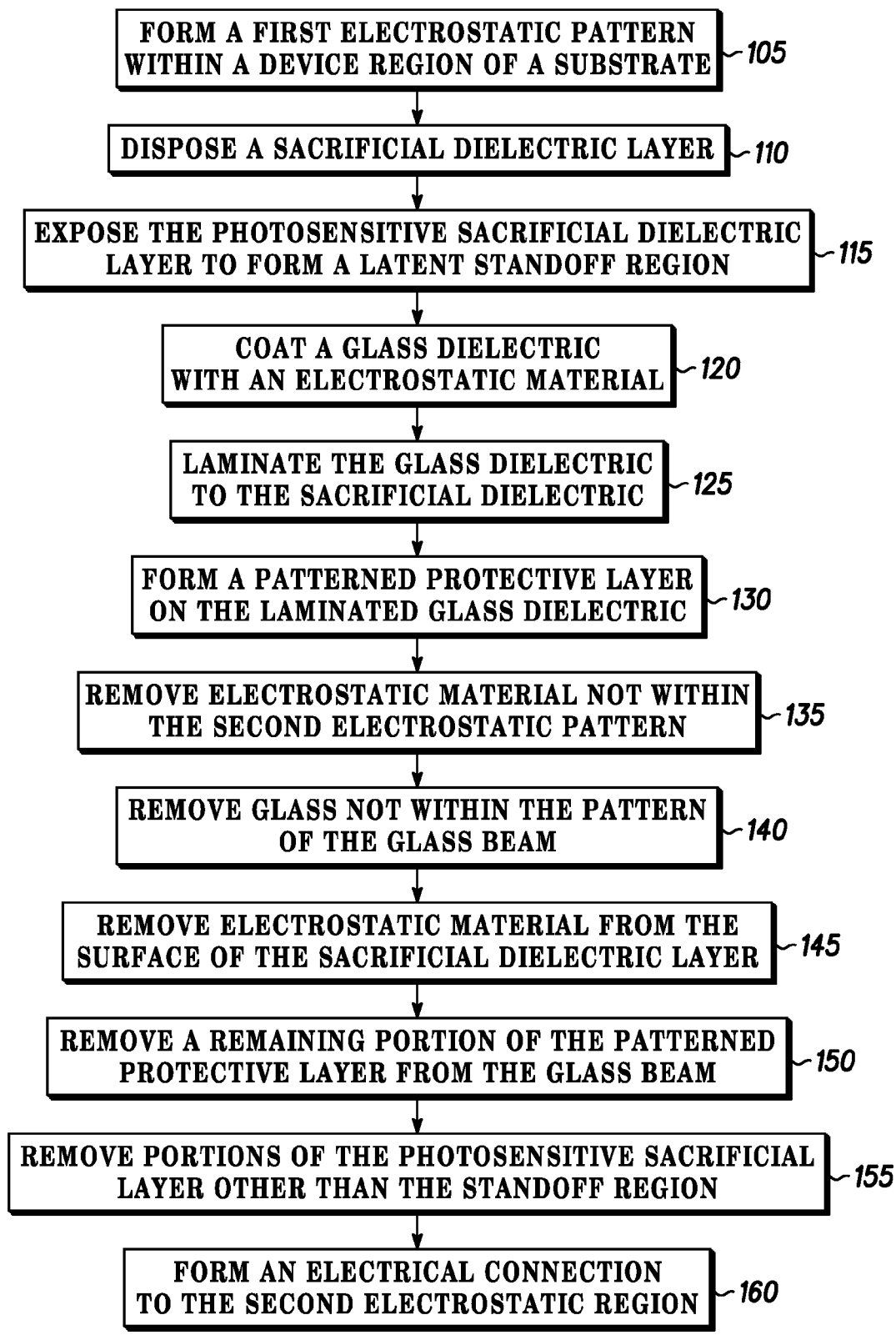
FIG. 1 is a flow chart that shows steps of a method of fabricating a meso-microelectromechanical system (meso-MEMS) in accordance with embodiments of the present invention.
Figure 2:
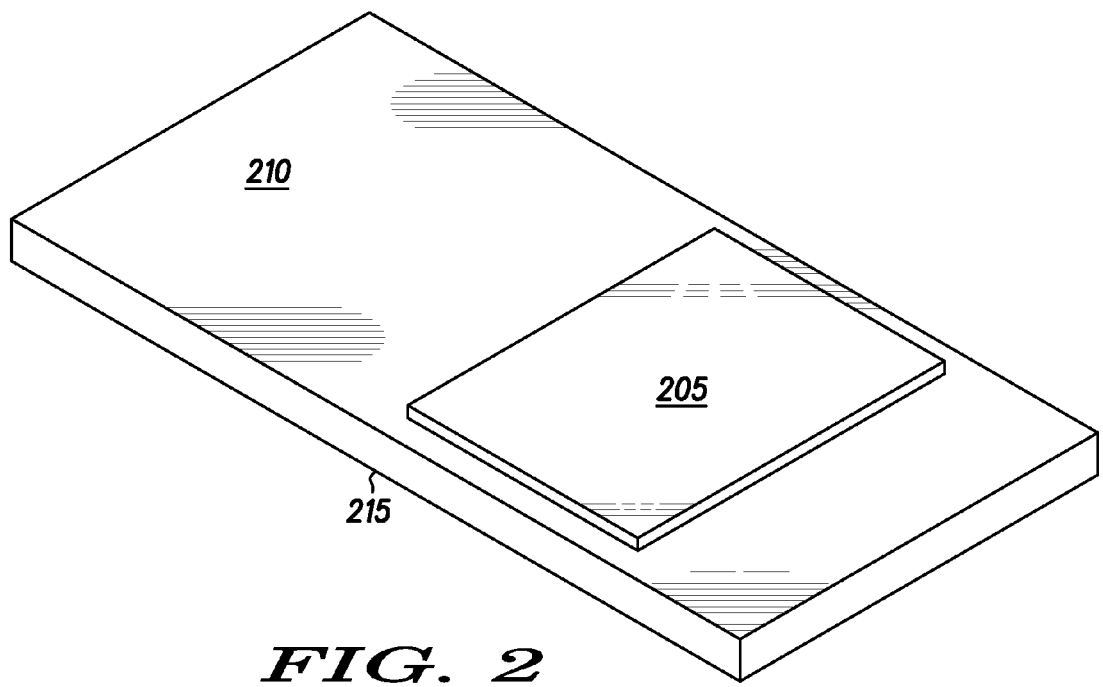
FIGS. 2-9 are mechanical drawings showing perspective views of a meso-MEMS structure at various stages of fabrication, in accordance with embodiments of the present invention.
Figure 3:
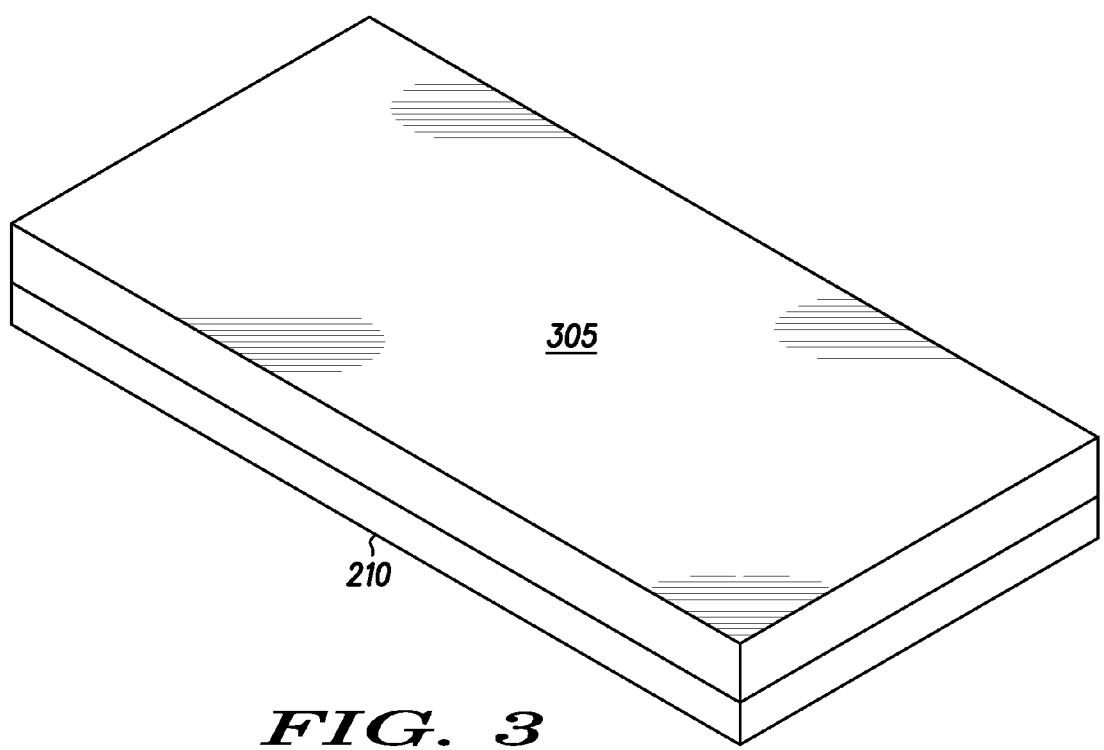
Figure 4:
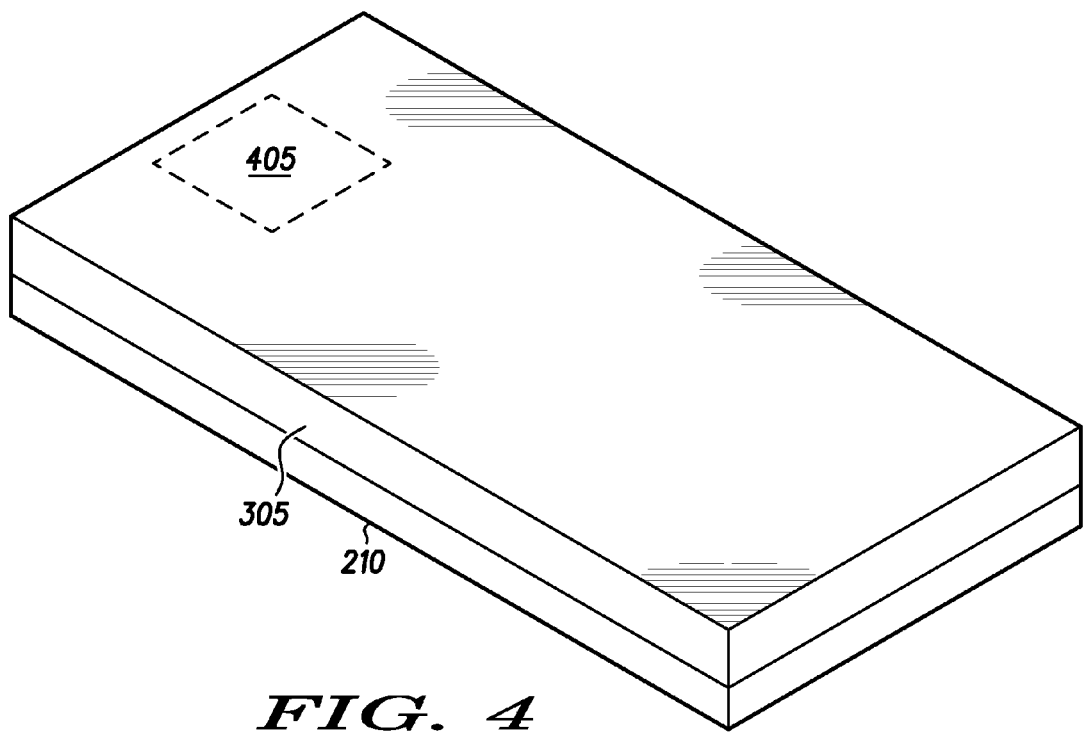
Figure 5:
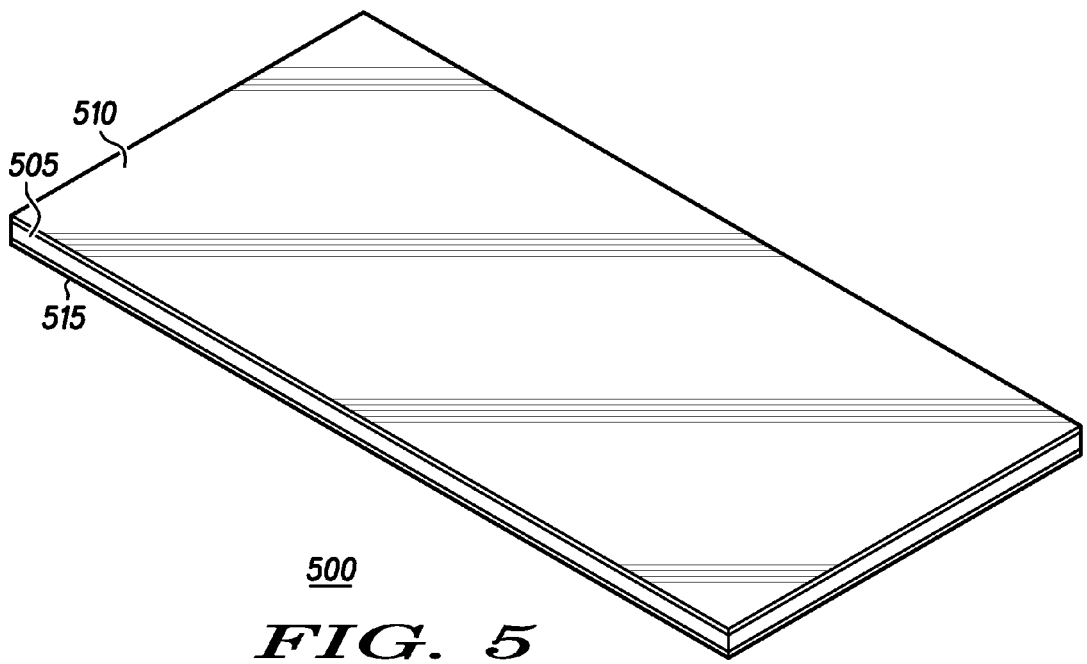
Figure 6:
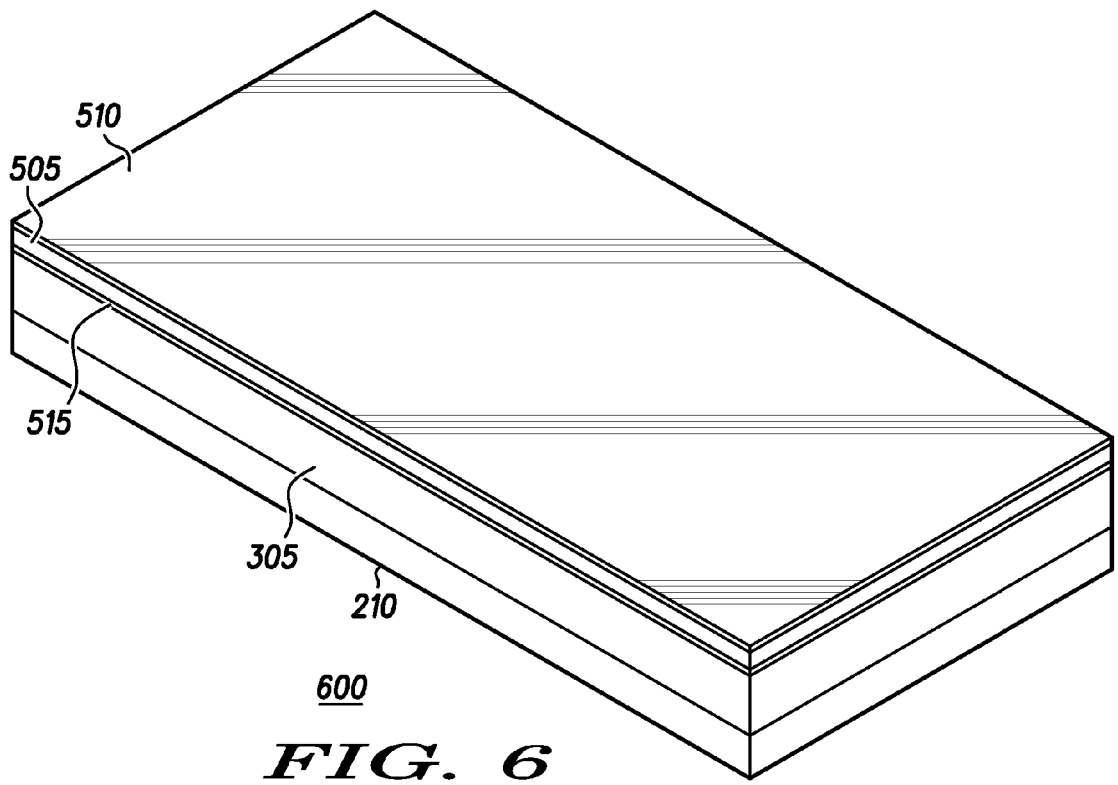
Figure 7:
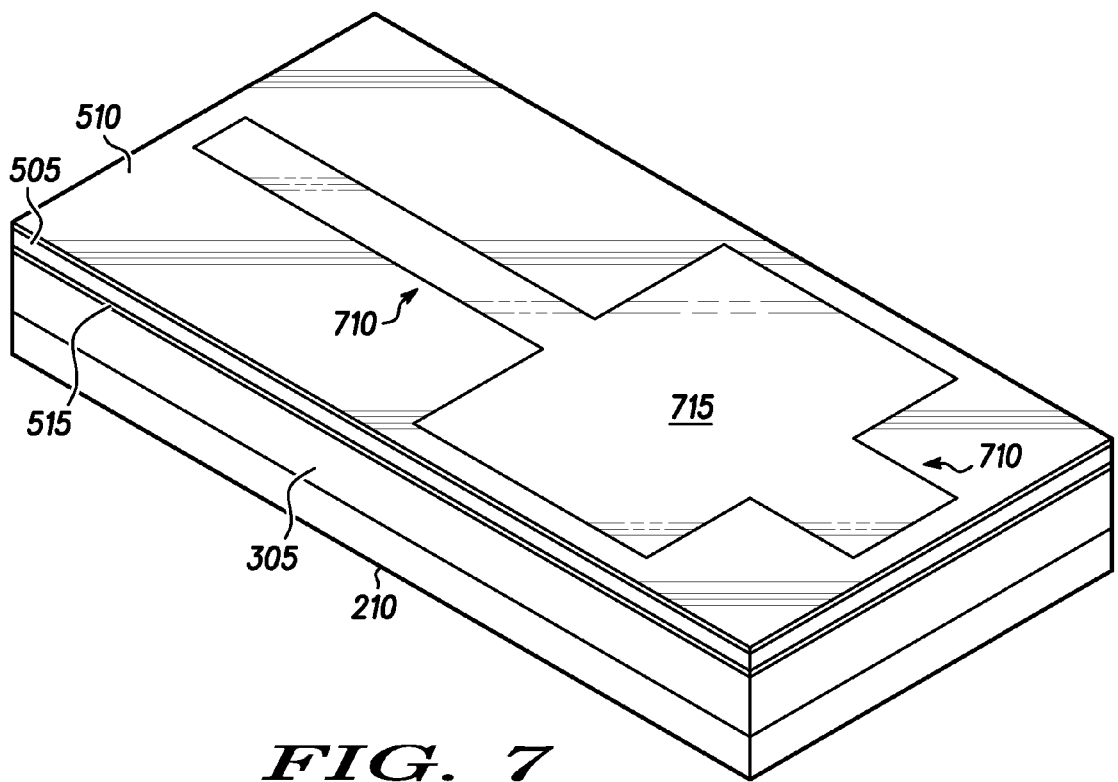

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE DRAWINGS

Before describing in detail the particular meso-microelectromechanical system (meso-MEMS) in accordance with the present invention, it should be observed that the present invention resides primarily in combinations of method steps and apparatus components related to micromechanical switching. Accordingly, the apparatus components and method steps have been represented where appropriate by conventional symbols in the drawings, showing only those specific details that are pertinent to understanding the present invention so as not to obscure the disclosure with details that will be readily apparent to those of ordinary skill in the art having the benefit of the description herein.

Referring to FIG. 1, a flow chart of a method for fabricating a meso-MEMS is shown, in accordance with embodiments of the present invention. FIGS. 2-9 are isometric views of the meso-MEMS in various stages of fabrication in accordance with embodiments of the present invention.

At step 105 (FIG. 1), a first electrostatic pattern 205 (see FIG. 2) is formed within a device region 210 of a substrate 215 from an inner metal layer on the substrate 215, in accordance with embodiments of the present invention. In some instances, the substrate 215 may be larger than the device 210. In the example being described with reference to FIG. 2, the device region 210 and substrate 215 are shown as being the same size. The substrate 215 may be made of any organic printed wiring board (PWB) material, of which one example is FR-4, or may be made of materials that are more expensive (e.g., Teflon) or less expensive (e.g., epoxy without glass fill). The substrate may be a multilayer PWB. The metal layer may be copper having a thickness between 2 and 70, and more typically between 5 microns and 35 microns, but could be of other materials such as nickel or gold or multilayers of metal, or alloys of metal. The metal need only be capable of holding and releasing an electrostatic charge. Copper is useful since it is relatively inexpensive and commonly used. The first electrostatic pattern 205 may be fabricated using conventional photo-lithographic patterning and etching techniques or applying a conductive paste by screen-printing, pad printing or other conventional thick film paste application method.

At step 110 (FIG. 1), a sacrificial photodielectric layer 305 (see FIG. 3) that is photosensitive is disposed over the device region 210 (FIG. 2), in accordance with embodiments of the present invention. The sacrificial photodielectric layer 305 is preferably a photo-sensitive (positive or negative) epoxy resin that may be deposited via roller coating or curtain coating to a thickness that is between 50 and 200 microns. An example of material that can be used for the sacrificial photodielectric layer 305 is the Probimer® 7081/82 photo-polymer resin material distributed by Huntsman of Basel, Switzerland. For this example, the resin material may be dried in an air assist infra-red horizontal drying oven for 30-60 minutes at a temperature of 60-80 C. The sacrificial photodielectric layer 305 may have a thickness between 7 microns and 200 microns, and more typically between 50 microns and 125 microns At step 115 (FIG. 1), the sacrificial photodielectric layer 305 is exposed to form a latent standoff region 405 (see FIG. 4), in accordance with embodiments of the present invention. As one example, once the sacrificial photodielectric layer 305 is dry, an artwork (film) is used to expose a pattern onto the photo-polymer using 1500-1700 milliJoules of ultraviolet irradiation, creating one or more "latent" imaged regions which include the latent standoff region 405. The latent standoff region 405 is defined by its differentially polymerized state as compared to the surrounding bulk material of the sacrificial photodielectric layer 305. The one or more latent imaged regions will act as anchoring points for the meso-MEMS of the present invention upon completion of its fabrication. Under conventional PWB fabrication circumstances, a PWB would undergo a thermal "bump" and then solvent developing immediately after UV exposure. In the present invention, the unimaged areas are not thermally bumped or developed until a later step. At this point the device region 210 is essentially still fully coated by the sacrificial photodielectric layer 305, presenting an essentially planar surface.

At step 120 (FIG. 1) a first side (top side) of a glass dielectric 505 (see FIG. 5) is coated with an electrostatic material 510, forming a coated glass dielectric 500, in accordance with embodiments of the present invention. Note that this step may occur before or after any of steps 105, 110, and 115. In embodiments for which a light reflecting surface (mirror) is needed (for example, for embodiments that are for optical light beam switching), and for which the reflective surface (mirror) is to be on a surface of the glass dielectric 505 (as opposed, for instance, to an embodiment in which a reflective surface is needed that is at some angle to the surface of the glass dielectric 505), materials are used in this coating step 120 that are both electrostatic and light reflecting. The glass dielectric 505 may be formed in the shape of the device region 210 (or smaller), and has a thickness that is typically between 30 and 50 microns, but which may be as small as 10 microns and as large as 75 microns. The coating of the top side of the glass dielectric 505 comprises applying one or more metal layers having a total thickness less than 25 microns. The second side (bottom side) of the glass dielectric 505 may also be coated with electrostatic material 515 during the coating of the first side, or as an independent step, or not at all. A first example of an electrostatic and light reflecting coating is sputtering approximately 500 Angstroms of titanium tungsten (Ti/W) on both sides of the glass dielectric 505, followed by sputtering approximately 1000 Angstroms of copper on both sides of the glass dielectric 505. A second example of coating is depositing by evaporation approximately 500 Angstroms of chrome followed by 5000 Angstroms of copper onto both surfaces of the glass dielectric 505. These electrostatic materials 510, 515 have very good light reflecting properties and are very compatible with conventional PWB processing techniques. Other metal layers may be used for electrostatic and light reflecting surfaces, for example chrome, chrome/gold, Ti/W, and Ti/W with copper, and tantalum, while a broader range of materials may be used for electrostatic only characteristics. Electrostatic only characteristics are useful for electronic switches, such as radio frequency (RF) switches. Other electrostatic materials 510 that may be used are other conductive metals, such as pure copper, nickel, silver, gold, or conductive metals alloys in combination with other materials. An electrostatic material 510 that is susceptible to conventional PWB etching techniques may be more useful if it is compatible with additional fabrication steps described herein below, but may still be usable to form the unique apparatus described herein even if not compatible with conventional PWB techniques.

As stated above, electrostatic materials may be formed on the top and bottom surfaces in the same step or steps. Thus, mirrored surfaces may also be formed on the top and bottom surfaces in the same steps. In some embodiments, the electrostatic materials are not formed on the top surface of the glass, but the electrostatic material is formed as a mirror material on the bottom surface.

It will be appreciated that in other embodiments of the present invention, a mirror may be formed on the top surface of the coated glass dielectric at a location other than the first electrostatic pattern 205, which may require a different shape of the glass beam than those described herein below.

At step 125 (FIG. 1), the coated glass dielectric 500 is laminated to the sacrificial photodielectric layer 305 (see FIG. 6), forming a laminated glass dielectric 600, in accordance with embodiments of the present invention. The sacrificial photodielectric layer 305 is still "tacky", particularly under heat and pressure, and acts as a "glue" for the metallized glass dielectric. Lamination of the coated glass dielectric 500 to the sacrificial dielectric layer 305 has been demonstrated in both a conventional PWB laminator (a Wabash laminating press made by Wabash MPI of Wabash, Ind.) and a conventional vacuum dry-film laminator. It is important to note that lamination temperature must not exceed 80 degrees C. in the embodiment of the present invention that uses the Probimer® sacrificial photodielectric layer 305. The process in the embodiment using the Probimer® sacrificial dielectric layer 305 is to laminate the coated glass dielectric 500 to the sacrificial photodielectric layer 305 in a vacuum laminator for approximately 10 minutes at 65-75 C.

At step 130 (FIG. 1), a patterned protective layer is formed on the laminated glass dielectric 600 having a protective pattern 710 (FIG. 7) of a glass beam in a desired geometry that includes a second electrostatic pattern 715 substantially co-extensive with the first electrostatic pattern 205, in accordance with embodiments of the present invention. This pattern comprises a standard temporary etch resist material, formed by conventional techniques, some examples of which are: photo-imaged and developed dry-film or liquid photo-resist; screen printing; and stenciling At step 135 (FIG. 1) a portion of the electrostatic material 510 on top of the coated glass dielectric 500 that is not within the second electrostatic pattern 715 is removed in accordance with embodiments of the present invention. Removing the portion of the electrostatic material 510 comprises applying an electrostatic material etchant. When the electrostatic material 510 comprises a top layer of copper, conventional copper etching chemistry (peroxide/sulfuric, cupric chloride, ammonium chloride, etc.) is used. This step may include etching with additional solutions when the electrostatic material 510 comprises multiple layers. In the example of a Ti/W layer under copper, the Ti/W layer outside the desired pattern that was located directly beneath the copper layer may be conveniently etched away by a warm (50 degrees Centigrade) hydrogen peroxide solution. In an alternative embodiment, a commercially available material distributed by the Shipley Company, L.L.C., of Marlborough, Mass. that is identified as 746 W etchant, which is commonly used for PWB copper etching, has also been demonstrated to effectively remove the Ti/W layer. When chrome is used as a part of the electrostatic material 510, then the chrome may be etched in cerric ammonium nitrate solution (available as a conventional chrome etchant "Chrome Etchant 1020" distributed by Transene Company, Inc. of Danvers, Mass.), followed by conventional copper etching as described above.

At step 140 (FIG. 1) glass not within the pattern of the glass beam is removed. The patterned protective layer 710 that had been applied to protect during the metal/mirror etch step 135 and the remaining patterned electrostatic material 510 that remains all act as inherent etch resists during the glass removal process. In one embodiment, the glass is etched in 25% hydrogen floride (HF) solution for approximately 25 minutes. The glass can alternatively be etched in ammonium bifloride solution, a buffered oxide etch solution (BOE) or fluorosilicic acid solution. In another embodiment, the glass can be removed by mechanical means, namely sandblasting. For example, horizontal sandblasting may be performed using 27 micron aluminum oxide particles at 80 pounds per square inch (552 kilopascals) ejected from a nozzle having a nozzle diameter of 0.035" (0.88 mm) at a distance from the substrate 215 of 2" (5.08 cm), and a conveyor speed of 4" (10.16 cm) per minute. When sandblasting is used, the patterned protective layer 710 may be applied to a greater thickness than usual, such as 50 to 100 microns.

At step 145 (FIG. 1), a portion of the electrostatic material 515 that was on the bottom of the coated glass dielectric 505 is removed from the surface of the sacrificial photodielectric layer 305, in accordance with embodiments of the present invention. The electrostatic material 510 (e.g., Ti/W-copper or chrome/copper) that was on the bottom of the removed glass needs to be removed from the exposed surface of the sacrificial photodielectric layer 305. The electrostatic material 515 (e.g., Ti/W-copper or chrome/copper) is removed by exposing the meso-MEMS structure 800 once again to appropriate etching solutions such as warm peroxide (or chrome etch) and standard copper etch solutions. It can be important to have this second layer of Ti/W-copper or chrome-copper during glass removal because it protects the epoxy resin from the glass removal agent, specifically during chemical etching. The resin is inherently resistant to HF but long term exposure may impair the photo-sensitive properties of the material. When sandblasting is used to remove glass, it may also be used to remove the portion of the electrostatic material 515 instead of etching the electrostatic material.

Figure 8:
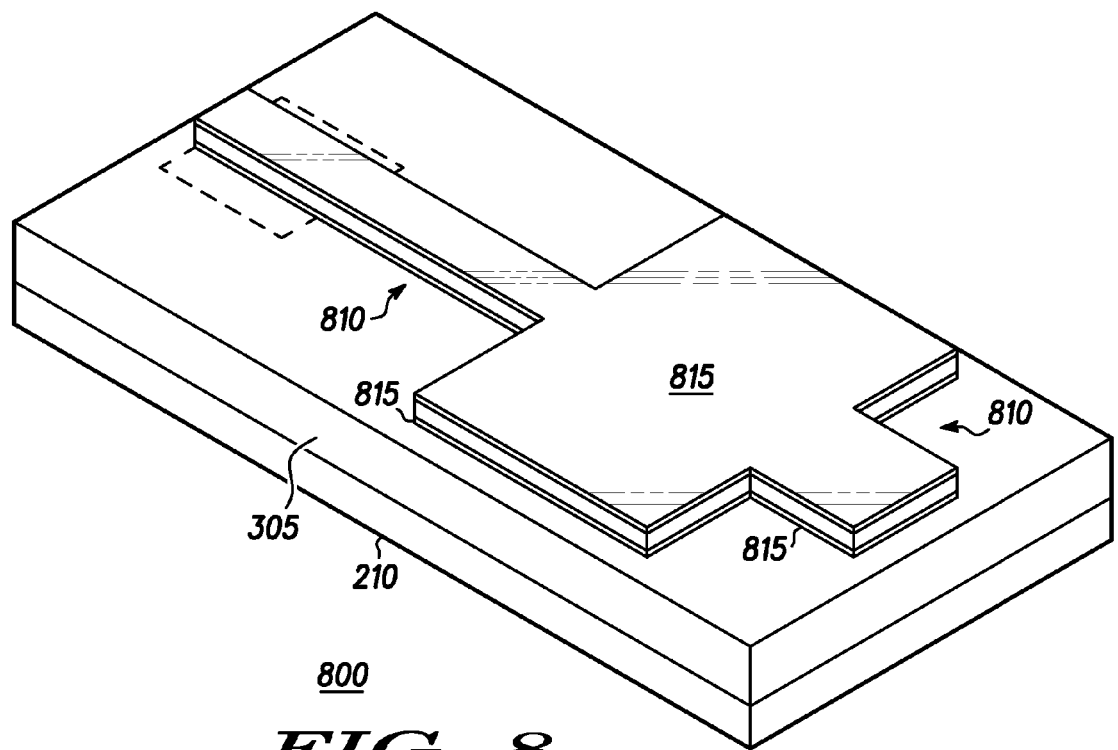

At step 150, after the portion of the electrostatic material 515 that was on the bottom of the coated glass dielectric 505 is removed, the remaining portion of the patterned protective layer 710 is removed from the top surface of the coated glass, leaving a glass beam having the electrostatic material 510 on the top surface of the glass beam, and exposing the reflective surface of the second electrostatic pattern 815 (FIG. 8). This step can be performed either before or after step 155. A solvent such as a water based solution of sodium hydroxide, which will dissolve the protective layer 705 essentially without harming other parts of the meso-MEMS structure 800 (FIG. 8) is used.

Referring to FIG. 8, a perspective view of the meso-MEMS structure 800 at this point of the fabrication is shown, in accordance with embodiments of the present invention. The remaining coated glass is now in a pattern having the shape of a glass beam that was determined by the protective pattern 710. The meso-MEMS structure 800 has a glass beam 810 with a second electrostatic pattern 815 that is essentially co-extensive with the first electrostatic pattern 205, that is on a cantilevered portion of the glass beam 810, and that is also a mirrored surface in this embodiment. When the electrostatic material is formed on both the top and bottom of the glass material 505, then the electrostatic pattern 815 is on both the top and bottom of the glass beam 810, and there may be a mirror surface on both sides, depending on the materials used for the electrostatic patterns 815. On the other hand, the electrostatic material may be formed on only the top or only the bottom of the glass beam 810.

At step 155 (FIG. 1), the sacrificial photodielectric layer 305, other than the lateral standoff region, is removed. In a first sub step, the sacrificial photodielectric layer 305 is thermally bumped for 60 minutes at 110-130 degrees Celsius in either a batch air convection oven or a horizontal air-assist IR oven to complete the photo-reaction initiated in the first stage of the meso-MEMS structure build-up, at steps 110, 115. After thermal bumping the sacrificial photodielectric layer is solvent developed, for example using gamma-butyrolactone (GBL) for 20 minutes with ultrasonic agitation, in a second sub-step. The GBL will penetrate under the glass beam 810, removing all un-polymerized material. The material which was latent imaged—the latent standoff region 405—remains as a standoff 905 while all the other sacrificial dielectric material will have been removed. Once all this sacrificial dielectric material has been removed, the glass beam 810 will have an air space underneath it allowing it freedom to change position according to electro-static actuation. It will be appreciated that in some embodiments there are a plurality of standoffs, and the glass beam may be substantially more complex than the one shown in FIGS. 2-10. It will be further appreciated that more than one glass beam could be simultaneously fabricated in a meso-MEMS structure by the methods described herein.

Figure 9:
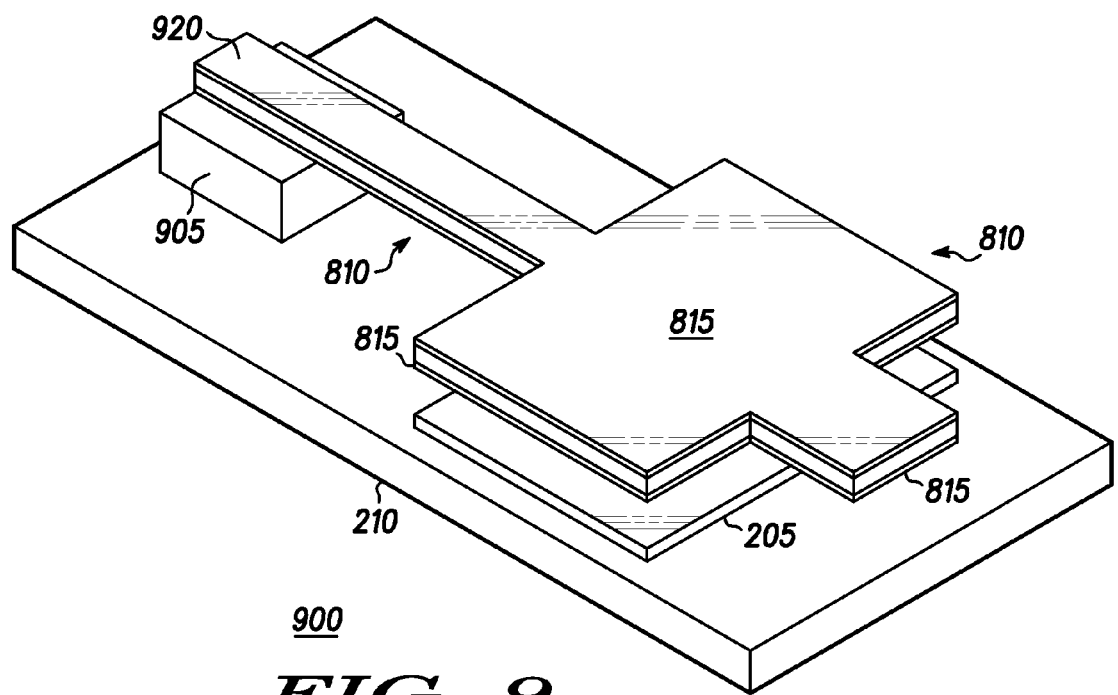
Figure 10:
FIG. 10 is a mechanical drawing showing a side view of a meso-MEMS structure at an advanced stage of fabrication, in accordance with embodiments of the present invention.

Referring to FIGS. 9 and 10, a perspective and a side view of a meso-MEMS structure 900 are shown, in accordance with embodiments of the present invention. The meso-MEMS structure 900 has been fabricated by the steps 105-155. The glass beam 810 has a fixed region 920 that is affixed to the standoff region 405, and has a relaxed separation 925 between the first and second electrostatic patterns 205, 815 that may be between 5 and 200 microns when no electrical potential exists between them (i.e., they are in a non-energized state). (The relaxed separation is largely determined by the thickness of the sacrificial photodielectric layer 305.) The second electrostatic pattern 815 is essentially parallel to the first electrostatic pattern when they are in a non-energized state. The approximate size of a meso-MEMS structure that has been fabricated using steps of the above described process is 3.5 mm long with an electrostatic pattern width of approximately 1.5 mm. Meso-MEMS structures such as meso-MEMS 900 can be used, for example, as an optical switch and can be fabricated more economically than, for example, a silicon based electro-optical-mechanical switch.

At step 160, an electrical connection is formed to the second electrostatic pattern 815 at or near a portion of the glass beam 810 laminated to the standoff region 405. This may be done in any reliable manner, such as soldering or wire bonding a wire to the electrostatic material 510 on the top and/or bottom surfaces (depending on whether the electrostatic pattern is on the top or bottom, or both) of the fixed region 920 of the glass beam 810, or by pressing a conductive material against the electrostatic material 510 near the fixed region 920 of the glass beam 810. Electrical connection to the first electrostatic pattern 205 may be conveniently provided by patterning a conventional printed wire that connects to the first electrostatic pattern 205 and to a connection pad on the substrate 215 that is for an electrical connector or that is connected to an electronic component, such as an integrated circuit terminal. It will be appreciated that by applying the electrostatic material onto only one surface of the glass material 505, and by using electrostatic materials that form a good mirror, the resulting mirror can be a front surface or back surface mirror for light that is incident on the top surface of the glass beam 810, which offers a design choice that may be beneficial. Also, it will be appreciated that in embodiments of the present invention, the electrostatic force can be applied to the electrostatic pattern 815 on either the top surface, the bottom surface, or both surfaces of the glass beam 810, offering other design choices that may be beneficial.

It will be appreciated that the examples described with reference to FIGS. 1-10 are related to a meso-MEMS structure having a glass beam with a straight flexible arm that allows movement along essentially one axis from the relaxed position, having a mirror that is moved by the movement of the arm. In this example, the second electrostatic pattern 815 and the mirror (reflective surface) are at the same location on the glass beam 810, a cantilevered location (i.e., a location near the end of the glass beam 810 that is farthest from the fixed region 920 of the glass beam 810). This is a simple and highly useful MEMS that can provide optical switching or modulation functions, but there are many variations of the present invention that can provide other useful functions. For example, the mirror may be located near, but not at, the cantilevered location of the second electrostatic pattern 205. As another example, an opposing pair of electrical contacts could be fabricated, one at the end 1005 of the glass beam 810 and another one on the substrate 215 at an opposing location 1010, and there may be no mirror. This example of an electrical switch meso-MEMS may not need to have multiple metals forming the electrostatic patterns 205, 815, and may operate as an RF switch. Such electrical contacts may alternatively be located nearer to the standoff region 405 than is the second electrostatic pattern 205. As another example, there may be a light directing device affixed to the glass beam 810 near or at the cantilevered location, instead of (or possibly in addition to) a mirror on the top or bottom surface of the glass beam 810. The light directing device could be a flat mirror or shutter (a non-reflecting, opaque plane) mounted at some planar angle with reference to the top surface of the glass beam 810, or an object of some other shape, such as a bar that is triangular in cross section with two mirrored surfaces, mounted on the glass beam 810 near the cantilevered location.

Figure 11:
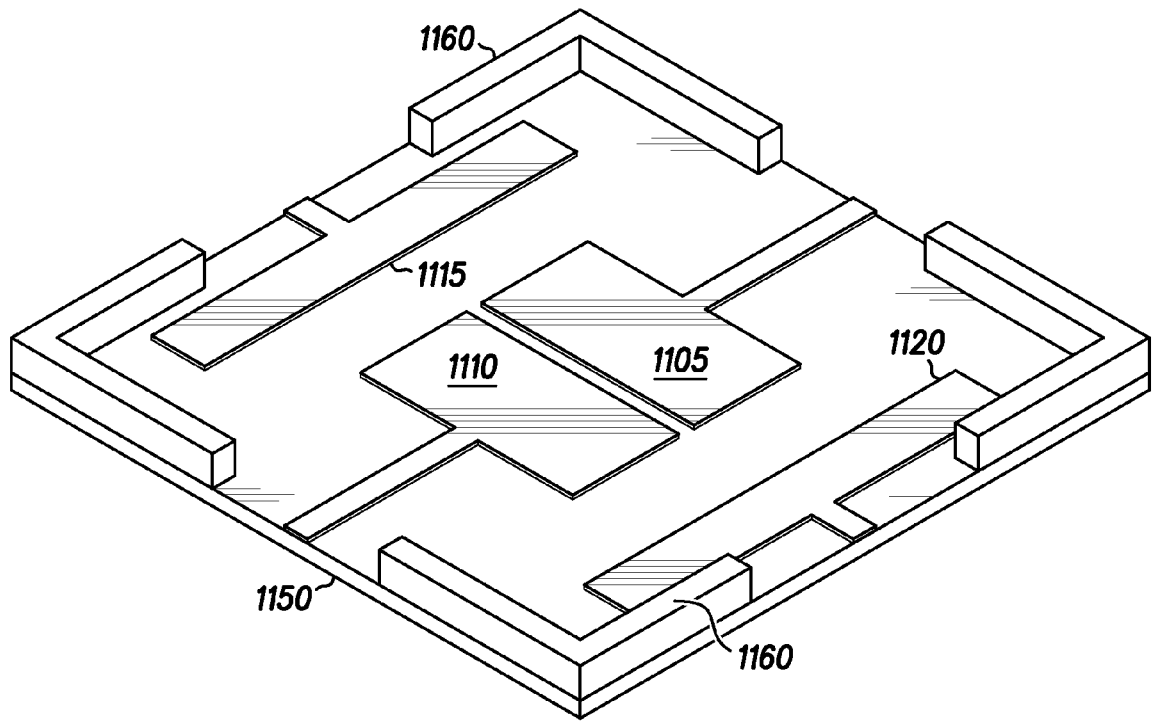
FIGS. 11 and 12 are mechanical drawings showing perspective views of a meso-MEMS structure, in accordance with embodiments of the present invention.
Figure 12:
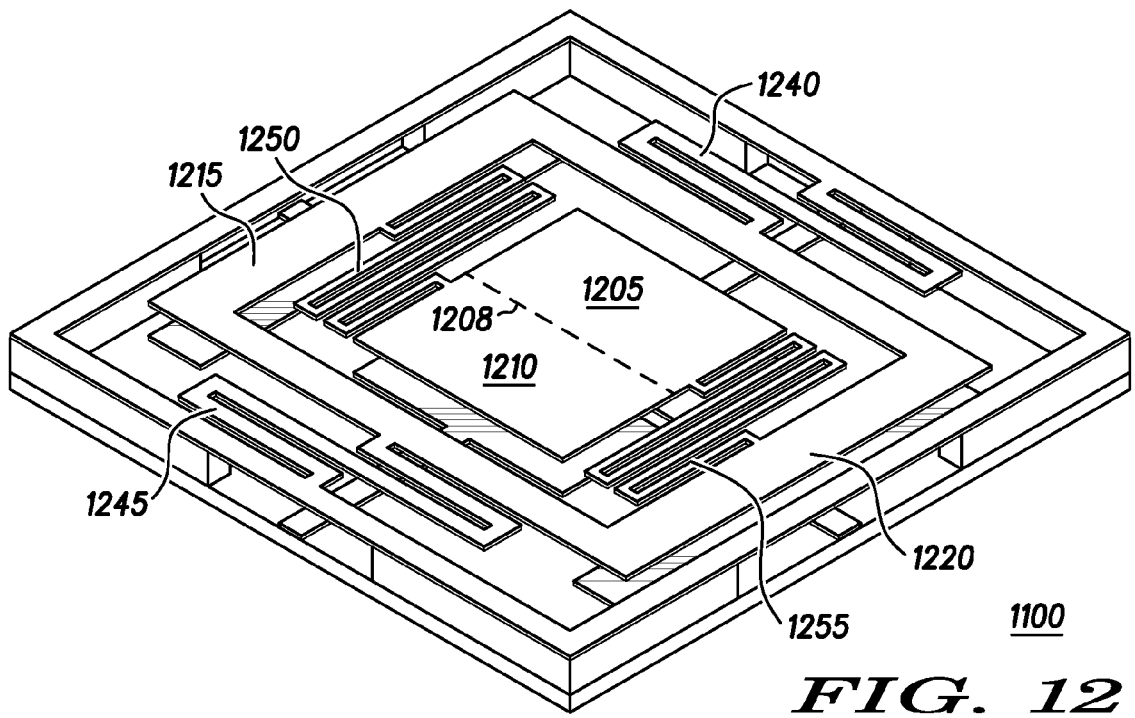

Referring now to FIGS. 11 and 12, perspective drawings of another example of an optical meso-MEMS structure 1100 are shown, in accordance with an embodiment of the present invention. The meso-MEMS structure 1100 is fabricated using essentially the same steps described above for the meso-MEMS structure 900. FIG. 12 shows the meso-MEMS structure 900 after the completion of steps 105-155, while FIG. 11 exposes the bottom portion of the meso-MEMS structure 900 (and does not relate to a specific fabrication step). It can be seen in FIGS. 11 and 12 that there are four pairs of electrostatic patterns comprising electrostatic patterns 1105, 1205, electrostatic patterns 1110, 1210, electrostatic patterns 1115, 1215 and electrostatic patterns 1120, 1220. Electrostatic patterns 1105, 1110, 1115, 1120 are formed on a substrate 1150. The electrostatic patterns 1215, 1220 are located at the cantilevered locations for flexible beam portions 1240, 1245, and electrostatic patterns 1205, 1210 are located at the cantilevered locations for flexible beam portions 1250, 1255 of the glass beam comprising the flexible portions 1205, 1210, 1240, 1245 and the electrostatic patterns 1205, 1210, 1215, 1220. For each electrostatic pair (1105, 1205), (1110, 1210), (1115, 1215), and (1120, 1220), the electrostatic patterns are substantially co-extensive and parallel to each other when the meso-MEMS is non-energized. The electrostatic patterns 1205, 1210 are conductively joined and also form a mirror that is used to move a light beam that is aimed onto the mirror, but the electrostatic patterns 1205, 1210 may be considered, for electrostatic energizing purposes, as two patterns split by the (imaginary) line 1208. The electrostatic patterns 1205, 1210 are conductively joined to each other (and to electrostatic patterns 1215, 1220, but may be considered, for electrostatic energizing purposes, as two electrostatic patterns. A common electrical potential can be applied to the four electrostatic patterns 1205, 1210, 1215, 1220 and the movement of the mirror is determined essentially by independent electrical potentials that can be applied to the electrostatic patterns 1105, 1110, 1115, 1120. It can be seen that the two pairs of electrostatic patterns (1105, 1205) and (1110, 1210) are at cantilevered locations along a first axis of freedom of movement of the mirror that is afforded by flexible glass beam arms 1240, 1245 and that the other two pairs of electrostatic patterns (1105, 1205) and (1110, 1210) are at cantilevered locations on a second axis of freedom of movement of the mirror afforded by flexible glass beam arms 1250, 1255 that is perpendicular to the first axis. Thus, by appropriate application of potential differences, the mirror can be moved in two axes, within angular displacement limits imposed at least by the dimensions of the meso-MEMS 1100. A device such as meso-MEMS 1100 could be used, for example, to scan a light beam to create an image. In a related embodiment, a single axis meso-MEMS may be constructed using only two pairs of electrostatic patterns on a common axis, such as electrostatic patterns (1115, 1215) and (1120, 1220) of FIG. 12 in an embodiment similar to that shown in FIG. 12, but with the entire area that includes electrostatic patterns 1215, 1220, beams 1250, 1255, and electrostatic patterns 1210, 1205 being a single, solid plate. A device of this type could be used, for example, to displace a light beam along an axis, under which a photosensitive paper is moved, to record voltages, as for an electrocardiogram.

Figure 13:
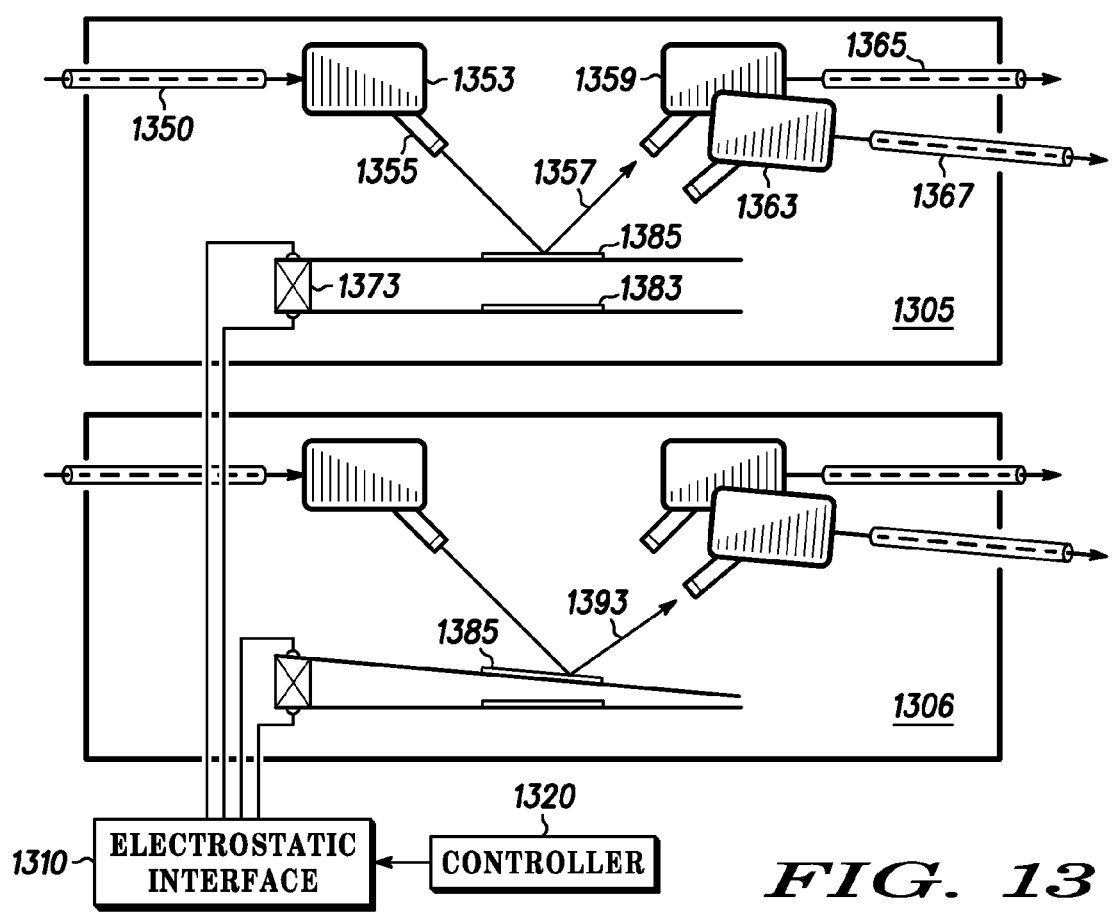
FIG. 13 is a schematic representation of an electrical equipment that includes meso-MEMS.

Referring to FIG. 13, a schematic and block diagram of an example of an electronic equipment which includes at least one meso-MEMS structure is shown, in accordance with an embodiment of the present invention. An optical switching network includes a bank of optical fiber switches 1305, 1306 each of which has a single optical fiber input 1350 and two optical fiber outputs 1365, 1367. The single optical fiber input 1350 can be switched to either one of the two optical fiber outputs 1365, 1367 as determined by a controller 1320 that is coupled to an electrostatic interface 1310. Each switch 1305 comprises a guide 1353 for the optical fiber input 1350 that directs an optical input signal to a mirror surface 1385 on a glass beam of the present invention. When the controller 1320 determines that a meso-MEMS device is not to be switched, as in the case of optical fiber switch 1305, the electrostatic interface 1310 removes essentially all electrostatic charge difference between the electrostatic patterns 1385, 1383, the glass beam assumes a relaxed position. As a consequence, the optical input signal reflects 1357 off the mirror 1385 to a first optical fiber output guide and amplifier 1359 and is guided out the optical fiber 1365 coupled to switch 1305, and optical fiber 1367 couple to switch 1305 has no signal. When the controller 1320 determines that a meso-MEMS device is to be switched, as in the case of optical fiber switch 1306, the electrostatic interface 1310 places an electrostatic charge difference onto the electrostatic patterns 1385, 1383. As a consequence, the glass beam assumes an energized, deflected position, and the optical input signal reflects 1393 off the mirror 1385 to a second optical fiber output guide and amplifier 1367 and is guided out the optical fiber 1367 coupled to switch 1306, and optical fiber 1365 coupled to switch 1306 has no signal.

The meso-MEMS structures formed in accordance with the present invention can be combined with silicon devices and other electronic components using PWB technology. Optoelectronic circuits thus formed (i.e., those including either electronic or photonic circuits, or both) can be complicated systems that include, for example, an essentially complete optical receiver, transmitter, or transceiver, and can be included in any of a very wide variety of optoelectronic assemblies (i.e., those including either electronic or photonic circuits, or both), including passive optical networks and consumer products such as projection displays and optical fiber-to-home set top boxes.

In the foregoing specification, the invention and its benefits and advantages have been described with reference to specific embodiments. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The term "another", as used herein, is defined as at least a second or more. The construction "either . . . or" is equivalent to a Boolean exclusive or statement. The terms "including" and/or "having", as used herein, are defined as comprising. The term "coupled", as used herein with reference to electro-optical technology, is defined as connected, although not necessarily directly, and not necessarily mechanically.

What is claimed is:

1. A method for fabricating a meso-microelectromechanical system, comprising:
    forming a first electrostatic pattern within a device region of a substrate from a metal layer on the substrate;
    disposing a sacrificial photodielectric layer over the device region;
    exposing the sacrificial photodielectric layer to form at least one latent standoff region;
    coating top and bottom surfaces of a glass dielectric with an electrostatic material;
    laminating the coated glass dielectric to the sacrificial photodielectric layer;
    forming a patterned protective layer on the coated glass dielectric having a pattern of a glass beam that includes a second electrostatic pattern substantially co-extensive with the first electrostatic pattern;
    removing glass and electrostatic material not within the pattern of the glass beam; and
    removing portions of the sacrificial photodielectric layer other than the at least one latent standoff region, thereby forming at least one standoff.

2. The method according to claim 1,
    wherein forming the patterned protective layer comprises
        applying a photosensitive etch resist at least 50 microns thick on the top surface of the glass dielectric, and
        exposing the photosensitive etch resist using a pattern; and
    wherein removing the glass and electrostatic material not within the pattern of the glass beam comprises sandblasting.

3. The method according to claim 1,
    wherein forming the patterned protective layer comprises
        applying a photosensitive etch resist, and
        exposing the photosensitive etch resist using a pattern; and
    wherein removing the glass and electrostatic material not within the pattern of the glass beam comprises applying a glass etchant.

4. The method according to claim 1, wherein removing portions of the sacrificial photodielectric layer further comprises solvent developing using ultrasonic agitation.

5. The method according to claim 1, further comprising:
    forming an electrical connection to the second electrostatic pattern at a portion of the glass beam laminated to the at least one standoff.

6. The method according to claim 1, wherein removing the glass and electrostatic material not within the pattern of the glass beam comprises at least one of a mechanical and chemical means.

* * * * *